United States Patent [19]
Jones et al.

[11] Patent Number: 5,421,600
[45] Date of Patent: Jun. 6, 1995

[54] TRAILER COUPLER SAFETY SYSTEM

[76] Inventors: Emery Jones, 350 Olive Ave., Novato, Calif. 94945; Joseph E. Kane, 604 Canyon Rd., Novato, Calif. 94947

[21] Appl. No.: 955,844

[22] Filed: Oct. 2, 1992

[51] Int. Cl.⁶ .............................................. B60T 7/20
[52] U.S. Cl. .................... 280/428; 280/432; 280/512; 340/431
[58] Field of Search ............. 280/428, 420, 422, 432, 280/506, 511, 512, 513; 340/431

[56] References Cited

U.S. PATENT DOCUMENTS

| | | | |
|---|---|---|---|
| 2,123,820 | 7/1938 | Winn | 280/428 |
| 2,676,225 | 4/1954 | Jubell | 280/422 |
| 3,110,507 | 11/1963 | Riner | 280/422 |
| 3,479,057 | 11/1969 | Miller | 280/432 |
| 3,535,679 | 10/1970 | Connors | 280/432 |
| 3,792,432 | 2/1974 | Ellis et al. | 340/52 |
| 3,840,276 | 10/1974 | Jubenville | 280/432 |
| 4,052,695 | 10/1977 | Myers | 280/432 |
| 4,271,401 | 6/1981 | Meo | 340/431 |
| 4,593,264 | 6/1986 | Engle | 340/52 |
| 4,627,633 | 12/1986 | Gehman et al. | 280/432 |
| 4,898,400 | 2/1990 | Elkins | 280/427 |
| 5,108,123 | 4/1992 | Rubenzik | 280/477 |
| 5,159,312 | 10/1992 | Engle | 340/431 |

*Primary Examiner*—Margaret A. Focarino
*Assistant Examiner*—A. M. Boehler
*Attorney, Agent, or Firm*—Coudert Brothers

[57] ABSTRACT

Safety apparatus for use with a trailer of the type having brakes is shown. If the latch mechanism on the trailer hitch is not properly closed, the brakes on the trailer are engaged thereby preventing the trailer from being towed. In addition, a warning device, such as a audible alarm and/or a light, signals the operator of the unlatched condition of the trailer hitch. If the latch mechanism becomes disengaged while the trailer is being towed, the warning device signals the operator and the brakes are engaged to stop the trailer. In a preferred embodiment actuation of the brakes is delayed to allow the operator time to stop the vehicle. The apparatus of the present invention may conveniently be mounted on the trailer so that it will be functional with any towing vehicle.

3 Claims, 2 Drawing Sheets

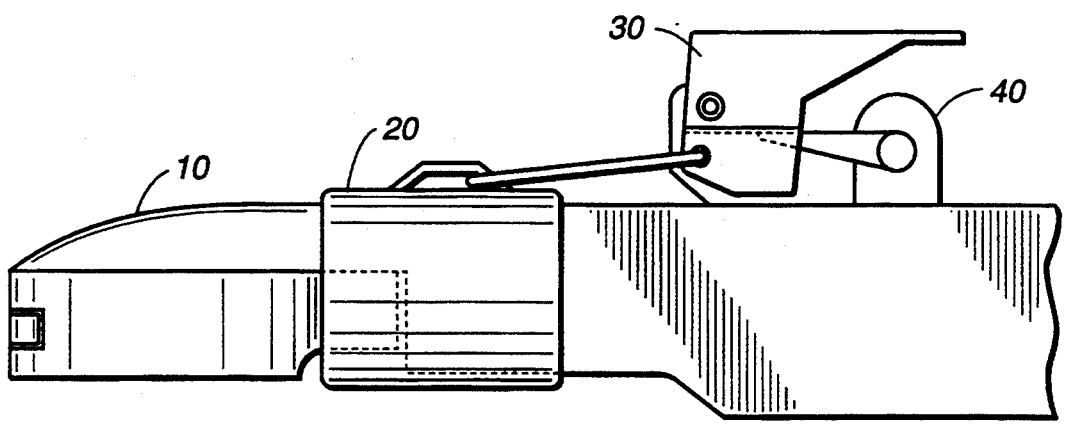
FIG._1
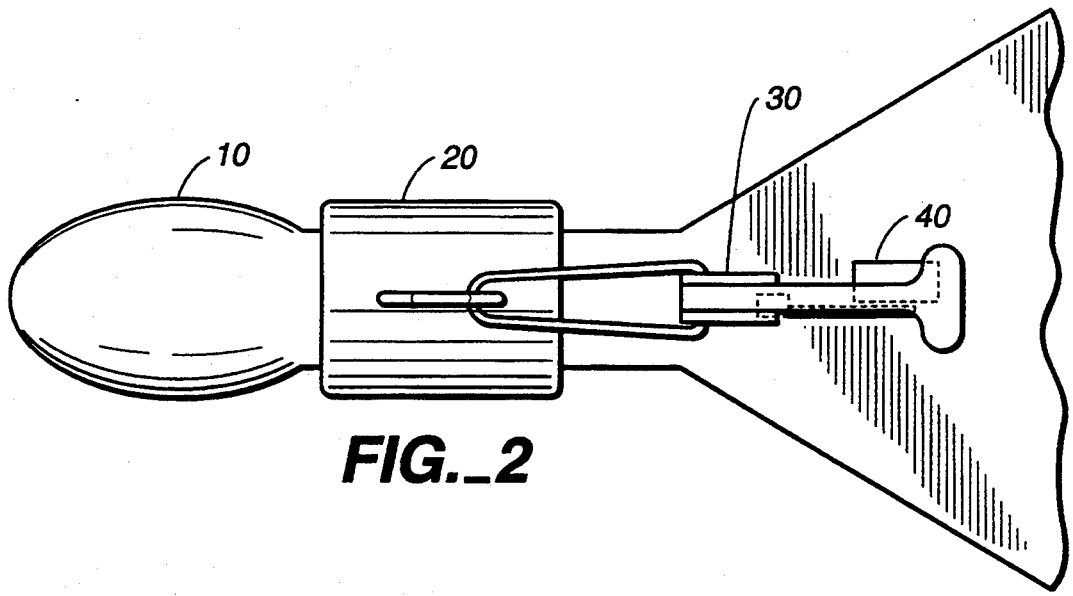
FIG._2
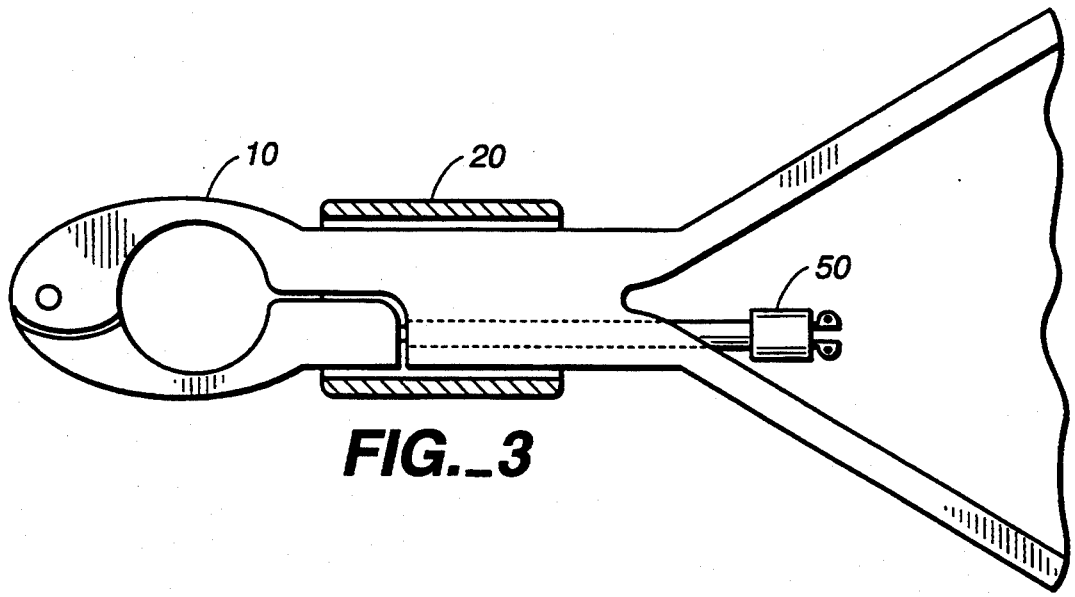
FIG._3

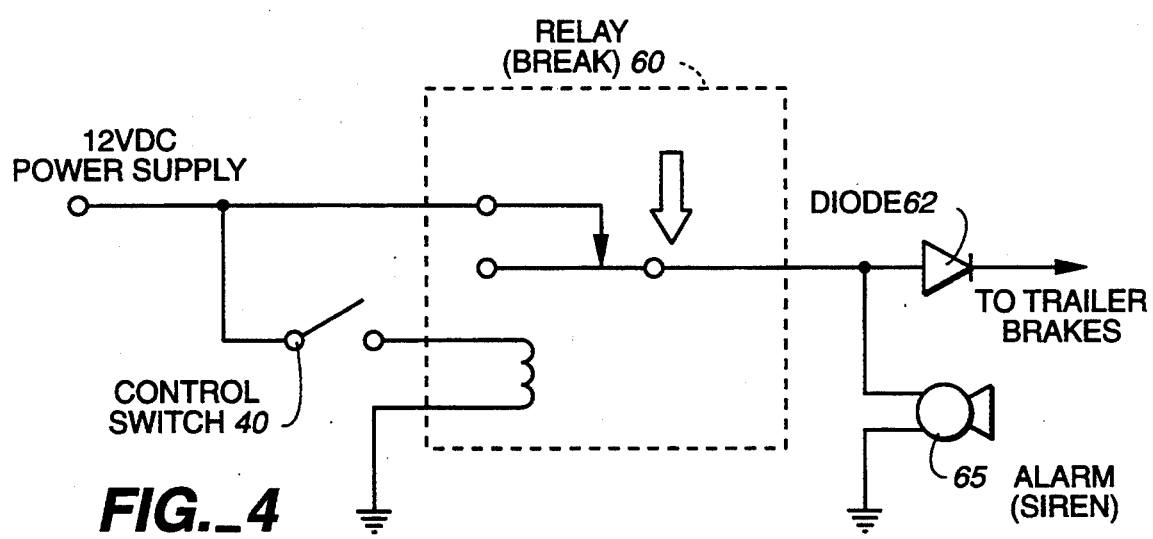
FIG._4

TRAILER COUPLER SAFETY SYSTEM

FIELD OF THE INVENTION

The present invention relates generally to trailer hitch safety systems. More specifically, the present invention relates to trailer hitch safety systems to assure that the trailer is properly secured to the towing vehicle prior to or during movement of the trailer.

BACKGROUND OF THE INVENTION

It has become common practice to transport cargo by way of a trailer which is towed behind a motor vehicle, such as a car or a truck. Due to the hazards associated with this means of transporting cargo, most states have adopted provisions, as part of their vehicle codes, which govern the methods and hardware used in connection with such towing. In addition, voluntary organizations, such as the Society of Automotive Engineers (SAE), and equipment manufacturers have adopted standards for improving the safety of towing cargo.

The most common type of trailer hitch in use today is composed of two basic components: a ball member mounted to the rear of the towing vehicle, and a mating socket member connected to the forward end of the towed trailer. Once the socket has been placed or seated on the ball member, a latch mechanism is actuated to securely couple the two together. Once the latch mechanism is actuated or closed in this manner, the socket will not become separated from the ball member. In addition to the primary attachment described, an electrical connection is usually made between the towing vehicle and the trailer to allow brake lights, turn signals, etc., mounted on the trailer to be activated from the towing vehicle. The ball and socket coupling, when attached together, provides maneuverability between the trailer and the towing vehicle to accommodate turning and uneven terrain.

Trailer hitches of this sort can fail for a number of reasons. Perhaps the most common causes of failure all relate, in one way or another, to the latch mechanism. These include failure of the latching mechanism, failure of the operator to properly actuate the latching mechanism, or failure of the operator to latch the coupling at all. As noted, if the latch is not properly secured or becomes open during transit the ball/socket coupling is subject to failure. Failure of the coupling can result in the separation of the trailer from the towing vehicle, usually with no warning to the operator, which can be extremely dangerous, resulting in the loss of a life and/or a valuable trailer and its cargo.

Certain trailers, particularly those of larger size, have electrically activated brakes which can be operated by the driver once electrical connection is made with the towing vehicle. The trailer brakes are activated simultaneously with the brakes on the towing vehicle and are controlled by the brake pedal. However, the braking force applied by the electrical trailer brakes is not dependent on the force applied to the brake pedal of the towing vehicle. Rather, the trailer brakes are either "on" or "off", but the level of braking force applied when they are turned "on" may be set manually, using a rheostat or similar control device, to be a set proportion of the total possible braking force of the trailer brakes. In this manner, the operator may adjust the braking force of the trailer brakes for varying loads.

In addition, the vehicle codes of most states require certain trailers to have safety braking systems, which are powered when the trailer becomes separated from the towing vehicle and electrical connection between the trailer and towing vehicle is broken. In most cases, these safety braking systems are powered by stand-by batteries located on the trailer as is described in greater detail below. Likewise, due to the frequency and severity of accidents resulting from separation of a trailer hitch coupling, most state vehicle codes require the use of safety chains to maintain connection between the trailer and the towing vehicle in the event of an uncoupling of the trailer hitch. While safety chains provide an added measure of protection, it is hard to control a trailer which is being towed only by chains, and accidents are common even when safety chains are used. Moreover, safety chains frequently break. For trailers having electrical brakes, there is normally a safety pull cable which is released after the chains break to activate the trailer brakes.

As described, a typical trailer with brakes has four connections with the towing vehicle: the primary ball/socket connection; the electrical connection for transmitting electrical signals to the trailer's brake lights, turn signals, brakes, etc.; safety chains connecting the trailer to the towing vehicle as a back-up safety system; and a breakaway cord attached to a switch to activate the trailer brakes. The breakaway cord is a pull-cable, longer than the safety chains, which is connected to an electrical switch controlling the trailer's electrical brakes. Ideally, if the ball and socket connection fails, the chains will prevent the trailer from disengaging entirely from the towing vehicle. However, if the chains break, then the breakaway cord is pulled, and the trailer brakes, typically powered by a twelve volt auxiliary dry cell battery on the trailer, are engaged to stop the trailer. The prior art devices rely on this braking system to slow the trailer to a stop; however, the unfortunate reality is that the battery on the trailer which controls the brakes is often dead or discharged, and therefore the brakes do not function in the intended manner in an emergency. Since the battery on board the trailer used to power the brakes is there solely for emergency purposes, trailer owners quite often neglect to periodically replace it.

The prior art describes various safety devices designed to detect the uncoupling of the trailer hitch and to alert the operator. Examples of prior art safety devices are described in Engle, U.S. Pat. No. 4,593,264; Gehman, et al., U.S. Pat. No. 4,627,633; and Ellis, et al., U.S. Pat. No. 3,792,432. The devices shown in these patents have the objective of warning the operator, usually by sounding an alarm, when the coupling has disengaged. Nonetheless, there are drawbacks to each of the devices shown. These devices are also limited in their usefulness, in that none of them prevent the coupling failure in the first place.

All of the prior art devices known to the inventors are activated only when the socket member actually separates from the ball member. Some of the devices in the aforementioned patents have specially designed, non-standard ball members with an electrical switch inside the ball, which is activated when the ball and socket separate. Other devices have an external switch activated by the socket member lifting off of the ball member. Thus, these devices will not warn the operator if the coupling is not secure, for example, if the latch has not been properly closed. Also, these prior art devices will not detect an unlatched coupler until the trailer has separated from the towing vehicle, which may be too late to prevent an accident.

Known prior art trailer hitch safety devices are mounted on the towing vehicle, rather than the trailer. Accordingly, if another towing vehicle lacking the specialized apparatus shown in the patent is used to tow the trailer, there will be no safety system present. Thus, the valuable cargo which may have prompted the purchase of the safety device may be unprotected if any other towing vehicle is used. It is noted that the use of different towing vehicles is common.

Known prior art devices also do not prevent the movement of an improperly secured trailer. All of the devices in the aforementioned patents merely warn the operator that the trailer is not coupled to the towing vehicle; none of them apply the trailer brakes to prevent the trailer from being towed when the coupling is not secured.

With these deficiencies of the prior art in mind, it is an object of the present invention to detect and notify the operator when the latching mechanism of a trailer hitch is not properly engaged.

It is also an object of this invention to notify the operator when the latching mechanism of the socket member becomes disengaged while being used, so that warning is given before the hitch becomes uncoupled.

Another object of the present invention is to activate the trailer brakes, using power from the towing vehicle, when the latching mechanism is not properly engaged, so that the trailer is prevented from moving if the connection is not secure.

Yet another object of the present invention is to activate the trailer brakes after a predetermined time period whenever the coupling fails while the trailer is being towed to stop the trailer as well as the towing vehicle.

It is also an object of the present invention to position the safety system of the present invention on the trailer, such that the trailer is protected regardless of the vehicle being used to tow it.

SUMMARY OF THE INVENTION

These and other objects that will be apparent to those of ordinary skill in the art after reading the present specification are realized in the present invention which comprises an apparatus for coupling a trailer with brakes to a towing vehicle, said coupling apparatus comprising hitching means, a latch mechanism for securing the hitching means, a detection system to verify that the latch is secure, and brake activating means utilizing electrical energy provided by the towing vehicle and connected to the detection system for activating the trailer brakes whenever the latch mechanism is not properly secured. The detection system may be an electrical switch connected to the latching mechanism, and it may be connected to an audio and/or visual alarm for signaling the operator whenever the latch is not properly secured. In the preferred embodiment, the detection system, the brake activating means, and the latch mechanism are all located on the trailer, so that the system may be utilized with any towing vehicle. Also in the preferred embodiment, a time delay relay and override circuitry are used with the trailer brakes to allow the operator to manually stop the trailer if it becomes unlatched while being towed before full breaking power is automatically applied by the apparatus.

BRIEF DESCRIPTION OF THE DRAWINGS

FIG. 1 is a side view of the trailer coupler safety system of one embodiment of the present invention.

FIG. 2 is a top view of the trailer coupler safety system, showing the use of a universal switch for detecting the position of the latching mechanism.

FIG. 3 is a bottom view of an embodiment of the present invention using a special switch adapted for a particular type of prior art socket member.

FIG. 4 is an electrical schematic of the wiring circuit of the present invention.

DETAILED DESCRIPTION OF THE INVENTION

FIG. 1 shows a preferred embodiment of the trailer coupler safety system of the present invention. In particular, FIG. 1 shows a trailer hitch socket member 10, with a locking sleeve 20 and a latching mechanism 30 to secure the socket member 10 to a mating ball member (not shown) mounted on the towing vehicle. Socket member 10, locking sleeve 20 and latching mechanism 30 are all situated near the end of the trailer tongue 15. The particular type of socket coupling shown in FIGS. 1-3, is commercially available from the Hammerblow Corporation, of El Paso, Tex. Those skilled in the art will recognize that many other couplings are commercially available and that the present invention may be used with such other couplings.

As shown in the embodiment of FIGS. 1 and 2, a normally closed switch 40 is mounted to the trailer tongue 15 such that the switch 40 is open with the latching mechanism secured and closed when the latching mechanism 30 is unsecured. Thereby, the switch functions to detect the state of the latching mechanism, i.e., whether it is open (unlatched) or closed (securely latched). The remaining elements of the electrical circuit are mounted on the trailer tongue 15 in weather proof box 80 towards the trailer. The electrical components within box 80 are shown schematically in FIG. 4 within dashed line 85.

Various types of switches may be used with the present invention to detect the state of latch mechanism 30. FIGS. 1 and 2 show a switch 40 of the type used as an automotive brake switch manufactured by General Motors. Such a switch is highly reliable and enduring. FIG. 3 shows a custom switch 50 designed by the inventors for use with the Hammerblow trailer tongue shown.

FIG. 4 shows the electrical schematic of the wiring circuit of the preferred embodiment. Power for the circuit is obtained from the electrical system of the towing vehicle through the electrical connection between the trailer and the towing vehicle. This electrical connection also provides electrical communication of the towing vehicle signal and braking functions to the trailer. Switch 40 is connected to the magnetic coil of the time delay relay 60, such that when the trailer is electrically connected to the towing vehicle, the coil is energized when the switch is closed (i.e., when the latching mechanism is not secured). Alarm 65, which is used in the preferred embodiment to provide a signal to the vehicle operator, is placed between switch 40 and the magnetic coil of time delay relay 60, and then connected to ground. If the switch is closed (i.e., if the latching mechanism is not secured), alarm 65 will be activated immediately after the trailer is electrically connected to the towing vehicle. This gives the operator a warning that the latch is not properly secured. Time delay relay 60 is connected to the trailer brakes and delays the application of the electrical trailer brakes for a predetermined period of time. (This delay feature is useful when the latch comes open while the vehicle is being towed, as described below). In the presently preferred embodiment, this delay period may be manually set by the operator. The presently preferred embodiment utilizes a National Controls Solid State Time Delay Relay, Model Number T1K-00180-466, which has an adjustable delay time range of approximately two to 180 seconds.

If the switch 40 is open (i.e., if the latching mechanism is secured), then current to the magnetic coil of time delay relay 60 is stopped, and the relay prevents the activation of the brakes. Alarm 65 will also be silenced, as it is on the same circuit as the magnetic coil of the relay. This notifies the operator that the trailer is properly secured.

In this manner, if the hitch is not latched, the operator will be unable to begin towing the trailer due to application of the trailer brakes. Likewise, if the latch becomes unsecured in the process of towing the trailer, the operator will be alerted to the unsecured state of the latch up to 180 seconds before the application of the trailer brakes, thus allowing a period of time for the operator to pull off of the road and stop. It should be noted that this invention bypasses the trailer brake pressure controller (e.g., rheostat) previously described, and applies the full braking power of the trailer brakes when activated.

The warning signal is provided by audible alarm 65. Alternatively, a signal light may be used instead of, or in addition to, the audible alarm. A diode 62 is connected in series with the trailer brakes to prevent reverse current flow in this line. Those skilled in the art will appreciate that there are other ways of accomplishing these ends without departing from the spirit and scope of the present invention, the described wiring circuit merely being a preferred embodiment.

As an alternative embodiment, the wiring circuit can be easily modified to reset the timer on the time delay relay or to suspend operation of the time delay relay whenever the brake pedal on the towing vehicle is depressed. An optional override signal line 95 from the brake pedal to the time delay relay is shown in FIG. 4. With this override feature the invention will not apply the trailer brakes at full braking power as long as the operator is using the brakes to stop the vehicle, thereby allowing more time to effect a controlled stop using the proportional brake setting that had been manually entered. Nonetheless, if the operator does not apply the brakes within the set delay period, they will be activated and further movement of the unlatched trailer will be inhibited. Thus, the driver will be prevented from ignoring the warning signal entirely.

In addition, it will be apparent to those skilled in the art that many different wiring circuits may be used to perform the same function as the preferred embodiment previously described. One such alternative would be the use of a normally open switch instead of the normally closed switch, and the use of a break relay instead of the time delay relay. In this variation, a time delay relay would need to be added in series with, and upstream of, the diode, and the alarm would need to be connected before the time delay relay and run to ground. This circuit would perform the same functions as the preferred embodiment, although it would be more complex.

In operation of the embodiment shown in FIGS. 1–3, when placing socket member 10 on a trailer hitch ball, the locking sleeve 20 is pulled back towards the trailer, and the latching mechanism 30 is not secured. After mating the ball and socket, sleeve 20 is pulled forward towards socket member 10, and the operator closes latch 30 to secure the coupling, thereby opening switch 40. When the electrical connection between the trailer and the towing vehicle is made, and switch 40 has been opened, neither alarm 65 nor the brakes are activated. However, if the latch has not been secured, and thus switch 40 has not been opened, current flows to alarm 65 and the time delay relay 60. Alarm 65 sounds immediately, alerting the operator of the unsecured hitch. After the manually adjusted time span has elapsed, current is applied to the magnetic coil of time delay relay 60, the relay closes, and current flows through the diode to the trailer brakes, preventing the trailer from being towed while the hitch is not secured.

As noted, in addition to preventing the trailer from being towed without a securely latched trailer hitch connection, the present invention will engage the brakes if the latching mechanism 30 fails or comes open due to road conditions or other unforeseen occurrences. If the latching mechanism 30 is released for any reason, switch 40 will be closed, thereby activating the audible alarm 65. After the manually set time period of the time delay relay 60, the magnetic coil will be energized, closing the circuit to the brakes, and activating the electrical brakes on the trailer. In this manner, the alarm will alert the operator of the towing vehicle of the unsafe condition of the hitch a period of time before the trailer brakes are activated, and thus allowing a safe stop. If the operator does not stop the vehicle within the selected time period of the time delay relay 60, then the trailer brakes will stop the towing vehicle before the trailer becomes unhitched or disengaged completely from the towing vehicle, as with known prior art systems. It should be noted that with good road conditions it may be possible to tow a trailer a long distance with an unlatched coupling, i.e., failure of the latching mechanism does not necessarily imply that uncoupling of the trailer hitch is imminent.

The alternative embodiment previously discussed has the additional benefit of restoring the time delay relay countdown when the towing vehicle's brakes are applied, thus allowing the operator to stop in a controlled manner without concern about the set delay, and without the full application of the trailer brakes.

The preferred embodiment of the trailer coupler safety system of the present invention is mounted entirely on the trailer, so that any towing vehicle may utilize the system without modification. Thus, the valuable cargo which necessitated the safety system will be protected, regardless of the towing vehicle used.

The invention is described in terms of the preferred embodiments. It will be realized that other modifications and variations will be apparent from the above description to those skilled in the art. These modifications and variations are intended to be within the scope of the present invention and the invention is not intended to be limited except by the following appended claims.

What is claimed is:

1. Apparatus for coupling a trailer having brakes to a towing vehicle having brakes and an electrical system, comprising:
   hitch means mounted on said trailer for engaging a mating coupling unit on said towing vehicle,
   latch means for securing said hitch means to said coupling unit, detection means for detecting whether said latch means has been properly secured,
   brake activation means cooperating with said detection means for activating said trailer brakes whenever said latch is not properly secured, such that said trailer brakes are applied prior to breakaway of said trailer from said towing vehicle, and
   time delay means cooperating with said brake activation means capable of producing an operator-adjustable delay period.

2. Apparatus for coupling a trailer having brakes to a towing vehicle having brakes and an electrical system, comprising:
   hitch means mounted on said trailer for engaging a mating coupling unit on said towing vehicle,
   latch means for securing said hitch means to said coupling unit, detection means for detecting whether said latch means has been properly secured,
   brake activation means cooperating with said detection means for activating said trailer brakes whenever said latch is not properly secured, such that said trailer brakes are applied prior to breakaway of said trailer from said towing vehicle,
   time delay means cooperating with said brake activation means capable of producing an adjustable delay period, and
   means for resetting said time delay means whenever said brakes of the towing vehicle are applied.

3. A system for ensuring the safe coupling of a trailer having electrically activated brakes to a towing vehicle, comprising:
   mechanical connection means for mechanically connecting said trailer to said towing vehicle, such that when said trailer is towed by said towing vehicle, said mechanical connection means including securing means for ensuring that said mechanical connection will not become disconnected while said vehicle is being towed;
   detection means for detecting whether said securing means has been properly engaged,
   brake activation means for activation of said brakes when said electrical connection is made and said securing means has not been properly engaged, and
   signalling means for alerting the driver of said towing vehicle whenever said electrical connection is made that said securing means has not been properly engaged,
   time delay means cooperating with said brake activation means such that said brakes are not activated until a period of time has elapsed, and
   override means for preventing the operation of said time delay means when said brakes of said towing vehicle are applied.

* * * * *